United States Patent
Carreel et al.

(10) Patent No.: US 9,939,309 B2
(45) Date of Patent: Apr. 10, 2018

(54) WEIGHING DEVICE AND METHOD WITH OFF-CENTER INDICATION

(71) Applicant: WITHINGS, Issy les Moulineaux (FR)

(72) Inventors: Eric Carreel, Meudon (FR); Nadine Buard, Meudon (FR); Xavier Debreuil, Issy les Moulineaux (FR); Victor Ting, Issy les Moulineaux (FR); David Campo, Paris (FR); Guillaume Faussard, Villiers-le-mahieu (FR); Florent Dusanter, Montrouge (FR)

(73) Assignee: WITHINGS, Issy les Moulineaux (FR)

( * ) Notice: Subject to any disclaimer, the term of this patent is extended or adjusted under 35 U.S.C. 154(b) by 22 days.

(21) Appl. No.: 14/415,704

(22) PCT Filed: Jul. 19, 2013

(86) PCT No.: PCT/FR2013/051754
§ 371 (c)(1),
(2) Date: Jan. 19, 2015

(87) PCT Pub. No.: WO2014/013208
PCT Pub. Date: Jan. 23, 2014

(65) Prior Publication Data
US 2015/0160068 A1 Jun. 11, 2015

(30) Foreign Application Priority Data

Jul. 19, 2012 (FR) .................................... 12 56995

(51) Int. Cl.
*G01G 3/14* (2006.01)
*G01G 19/44* (2006.01)

(52) U.S. Cl.
CPC ......... *G01G 3/1402* (2013.01); *G01G 3/1404* (2013.01); *G01G 19/44* (2013.01)

(58) Field of Classification Search
CPC .... G01G 3/1402; G01G 3/1404; G01G 19/44; G01G 23/01
See application file for complete search history.

(56) References Cited

U.S. PATENT DOCUMENTS 2,653,475 A * 9/1953 Kraus ..................... G01G 19/44
 177/200
3,906,931 A 9/1975 Terekhov
(Continued)

OTHER PUBLICATIONS

International Search report and Written Opinion for related International Application PCT/FR2013/051754; report dated Sep. 30, 2013.

*Primary Examiner* — Randy Gibson
(74) *Attorney, Agent, or Firm* — Miller, Matthias & Hull LLP

(57) ABSTRACT

Electronic scale including four feet, four strain gauges, an electronic control unit and a display, where the gauges are combined in pairs in first and second Wheatstone bridge type circuits, where a first intermediate-point of the bridge is selectively connected via a switch to an intermediate voltage source and where the first and second outputs of the amplifiers are summed by the electronic control unit in order to deduce therefrom a weight for an object present on the device, with indication for the user of off-center condition on the scale. Weighing method implemented in such a scale.

13 Claims, 2 Drawing Sheets

(56) References Cited

U.S. PATENT DOCUMENTS

| | | | | |
|---|---|---|---|---|
| 4,556,115 | A | * | 12/1985 | Lockery ................. G01G 3/142 |
| | | | | 177/211 |
| 4,573,542 | A | | 3/1986 | Schlegel et al. |
| 4,848,477 | A | * | 7/1989 | Oldendorf .............. G01G 23/01 |
| | | | | 177/25.14 |
| 4,909,338 | A | * | 3/1990 | Vitunic .................. G01G 23/01 |
| | | | | 177/164 |
| 4,993,506 | A | * | 2/1991 | Angel .................... G01G 19/44 |
| | | | | 177/211 |
| 5,724,267 | A | | 3/1998 | Richards |
| 5,886,302 | A | * | 3/1999 | Germanton ........... G01G 19/44 |
| | | | | 174/135 |
| 7,100,439 | B2 | * | 9/2006 | Carlucci ................ G01G 19/44 |
| | | | | 177/199 |
| 7,126,065 | B2 | * | 10/2006 | Petrucelli .............. G01G 17/08 |
| | | | | 177/177 |

\* cited by examiner

WEIGHING DEVICE AND METHOD WITH OFF-CENTER INDICATION

CROSS-REFERENCE TO RELATED APPLICATION

This Application is a 35 USC § 371 US National Stage filing of International Application No. PCT/FR2013/051754 filed on Jul. 19, 2013, and claims priority under the Paris Convention to French Patent Application No. 12 56995 filed on Jul. 19, 2012.

FIELD OF THE DISCLOSURE

The present invention relates to weighing devices and methods.

BACKGROUND OF THE DISCLOSURE

More specifically, the invention relates to the domain of electronic scales for weighing persons. Very often these devices are equipped with four feet, where each of these feet is equipped with a strain gauge. It is known from the prior art to arrange each of said strain gauges in a specific Wheatstone bridge type circuit and to add up the digitized values read at the outputs from the Wheatstone bridges, like for example in document U.S. Pat. No. 5,724,267. The cost of this solution is high.

Furthermore, it is also known to multiplex the reading of the Wheatstone bridges, but the cost of this variant is also high.

Additionally, it is also known to show the user by means of indicators or arrows on the display that their weight is not sufficiently centered on the weighing device, which is a useful function for improving the weighing precision.

A need arises for reducing the cost of such weighing devices while also maintaining all or part of the function of indicating by arrows the user being off-center on the scale.

SUMMARY OF THE DISCLOSURE

For this purpose, the invention especially proposes a weighing device including four feet, where the left-front foot includes a left-front strain gauge, the right-front foot includes a right-front strain gauge, the left-rear foot includes a left-rear strain gauge and the right-rear foot includes a right-rear strain gauge; the weighing device furthermore includes an electronic control unit and a display, where the right-front and right-rear strain gauges are combined in a first Wheatstone bridge type circuit with a first output coming from a first amplifier and the left-front and left-rear strain gauge are arranged in a second Wheatstone bridge type circuit with a second output coming from a second amplifier, and where the first and second outputs are connected to the electronic control unit to be digitized and added and for thus deducing therefrom the weight of an object present on the device.

Thanks to these arrangements, only two Wheatstone bridges are used for the weighing. Furthermore, it is possible to recognize being off-center left-right by comparing the two digitized outputs and indicating this off-center position to the user.

According to another aspect of the present invention, a weighing device is proposed like the one described above and in which each Wheatstone bridge type circuit includes a first branch comprising two first resistors in series between a reference voltage Vs and a ground potential with a first intermediate-point interposed between the two first resistors, and a second branch comprising two second resistors in series between the reference voltage and the ground potential with a second intermediate-point interposed between the two second resistors, where the first and second intermediate-points are connected respectively to the corresponding amplifier, where one of the first or second intermediate-points is connected to the corresponding amplifier, and where one of the first or second intermediate-points can furthermore be selectively connected via a switch to an intermediate voltage source such that when the switch is active, the voltage difference read between the first and second intermediate points is representative of a front-rear imbalance.

Thanks to these arrangements, only two Wheatstone bridges are used to perform the weighing and furthermore it is possible to recognize being off-center left-right and being off-center front-rear and indicate being off-center to the user by means of one corner arrow among four corner arrows, so that the user can reposition.

In the embodiments of the method according to the invention, one and/or the other of the following dispositions could furthermore be used.

According to an advantageous aspect, the first two resistors of each Wheatstone bridge type circuit include a front-gauge first resistor arranged between the ground potential and the first intermediate point and a front-gauge second resistor arranged between the first intermediate-point and the reference voltage Vs, the two second resistors of each Wheatstone bridge type circuit include a rear-gauge first resistor arranged between the ground potential and the second intermediate-point and a rear-gauge second resistor arranged between the second intermediate-point and the reference voltage, where the front-gauge first resistor and the rear-gauge first resistor increase with the load whereas the front-gauge second resistor and the rear-gauge second resistor decrease with the load. Because of this, the sensitivity of the measurement chain is optimized and a possible temperature drift can be compensated.

According to another advantageous aspect, the electronic control unit can be configured for displaying at least one indication of being off-center on the display such that the user is encouraged to better position themself on the scale; such an indication can be limited to indicating being off-center left-right or can be more precise.

According to another advantageous aspect, the display screen can include four corner arrows corresponding respectively to the four feet of the device, where one of the four arrows can be displayed in case of being substantially off-center towards one corner.

In this way, a simple and ergonomic solution is proposed for indicating to the user being off-center on the scale.

According to another advantageous aspect, the intermediate voltage is half of the reference voltage Vs such that the device works in an optimal zone for the linearity of the response.

Additionally, the invention also relates to a method implemented in a weighing device such as described above, where the method includes at least the following steps:
a- a calibration step during which a first series of parameters is recorded for a plurality of reference weights placed successively on the weighing device, and a second series of parameters for the plurality of reference weights placed successively on the weighing device with the switch activated so the first intermediate-point is connected to the intermediate-voltage source;

b1- a weighing step during which the first and second outputs are measured with the switches open and the resulting digitized total corrected by means of the first series of parameters in order to obtain an estimated weight;

b2- an off-center evaluation step during which the switch is made active and the total of the first and second outputs are compared to a point from the second series of parameters corresponding to the estimated weight in order to identify an off-center condition and indicate it to the user;

c- steps b1- and b2- are repeated.

Because of this, an off-center condition can be identified and indicated to the user by means of the calibration values by using a simple electronic circuit.

In the embodiments of the method according to the invention, furthermore one and/or the other of the following dispositions could be used.

According to another advantageous aspect, the iteration of steps b1- and b2- is stopped when the evaluation of the off-center distance is less that a preset threshold during at least a preset time and then the resulting estimated weight is displayed on the display. These means are used to determine the convergence of the weight measurement.

According to another advantageous aspect, the display can comprise corner arrows and a left-right off-center condition can be identified by comparing the first and second outputs from step b1-, and a front-rear off-center condition can be identified by comparing the total of the first and second outputs to the second series of parameters in step b2- in order to determine whether it is necessary to display a corner arrow corresponding to the more heavily loaded strain gauge. In this way a clear and concise indication can be displayed for the user.

According to another advantageous aspect, the user can select an element/item on the display by being intentionally off-center left-right. By these means, this left-right off-center user position can be incorporated into the user interface functions of the scale.

According to another advantageous aspect, the measured weight can be displayed on the display as a function of the total of the first and second outputs and a correction by means of the first series of parameters such that a measurement-chain gain-correction can be performed.

According to another advantageous aspect, the method can additionally include:

b0- a taring step during which a tare measurement is done with no object placed on the device and a subsequent measurement is compensated by an offset corresponding to the tare measurement.

BRIEF DESCRIPTION OF THE DRAWINGS

Other features and advantages of the invention will become apparent during the following description of one of the embodiments thereof, given as a nonlimiting example, with reference to the attached drawings.

In the drawings.

On the various figures, the same references designate identical or similar items.

Figure 1:
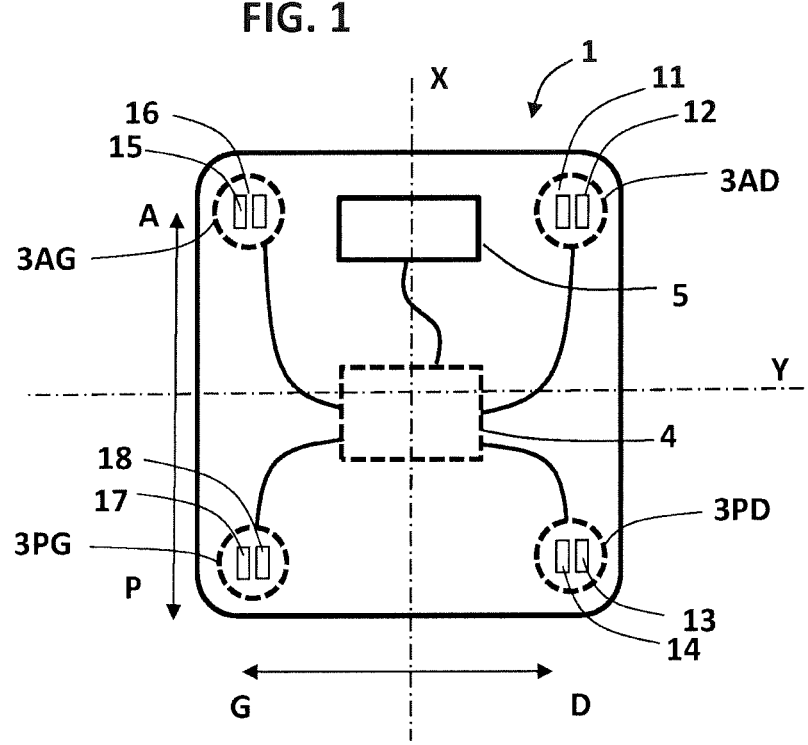
FIG. 1 is a general top view of the weighing device according to the invention.

FIG. 1 shows an example weighing device according to an embodiment of the invention.

DETAILED DESCRIPTION OF THE DISCLOSURE

In the example shown, this weighing device is an electronic scale 1 on which the user can stand for measuring in particular their weight.

The electronic scale 1 includes a main body of generally rectangular or square shape and four feet placed respectively near the four corners of the body, each foot comprising measurement means.

More specifically, the left-front foot includes a left-front strain gauge 3AG, the right-front foot includes a right-front strain gauge 3AD, the left-rear foot includes a left-rear strain gauge 3PG and the right-rear foot includes a right-rear strain gauge 3PD.

In FIG. 1, the front-rear direction is referenced by the X-axis, the letter A designating the front and the letter P designating the rear, whereas the left-right direction is referenced by the Y-axis, extending between the left-side denoted G and the right-side denoted D.

The electronic scale 1 additionally includes an electronic control unit 4 and a display 5 which will be discussed in more detail later.

As for the strain gauges already mentioned, double extensiometric gauges of known type will preferably be selected, in particular gauges comprising a first element whose resistance increases under the effect of a vertical compression applied to the considered foot and a second element whose resistance decreases under the effect of said vertical compression. However, the use of extensiometric gauges comprising a single element sensitive to the vertical strain is not excluded.

In the example illustrated here, the right-front strain gauge 3AD includes such a first element 11 called first resistor of right-front gauge 11, and such a second element called second resistor of right-front gauge 12.

Analogously, the right-rear strain gauge 3PD includes such a first element called first resistor of right-rear gauge 13 and such a second element called second resistor of right-rear gauge 14.

Similarly for the left side, the left-front strain gauge 3AG includes such a first element 15 called first resistor of left-front gauge 15, and such a second element called second resistor of left-front gauge 16.

Finally, the left-rear strain gauge 3PG includes such a first element 17 called first resistor of left-rear gauge 17 and such a second element called second resistor of left-rear gauge 18.

Each of the resistors 11-18 has respectively are resistance value noted R1-R8. In the example shown here, the odd-numbered resistors resistance increase with the applied vertical compression force on the feet whereas conversely the even-numbered resistors resistance decrease with the applied force.

In a typical example, the four resistors of the bridge are selected with the same nominal value, for example 500 ohms or 1 kilo-ohms (1 kΩ).

Figure 2:
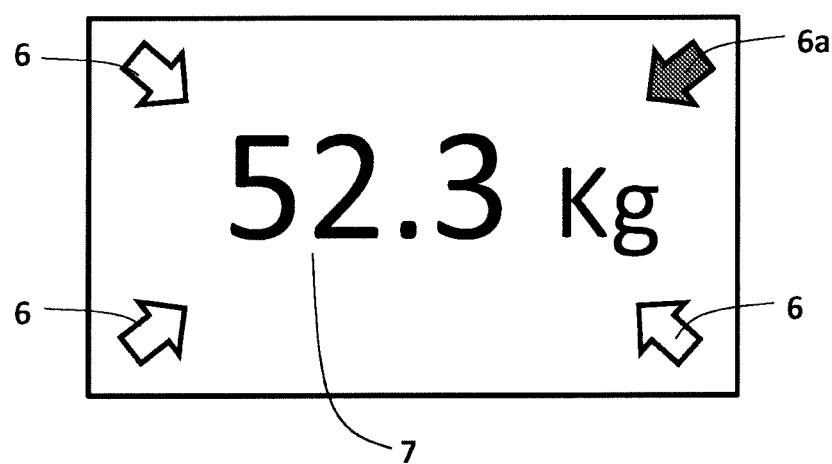
FIG. 2 shows a display presented on a display of the weighing device from FIG. 1.

As shown in FIG. 2, the display 5 includes a central area in which the estimated weight 7 for the object or person present on the scale 1 can be displayed. Additionally, in the peripheral area around said central area, one or more off-center indicators 6 can be displayed. In this case, the display includes four graphic indicators which will be called in the remainder of the present description "corner arrows." The function of these indicators is to show the user present on the scale whether the position is off-center relative to an ideal centered position for which the forces are substantially equally distributed on the four feet of the scale.

The weight measurement is in fact the most precise in a well centered position.

In the example shown, with four corner arrows, a single arrow 6a can be activated to show the user the direction to move to correct an off-center condition as observed. Activation of an arrow can consist of making it blink, lighting it when the others remain unlit or any other manner.

It should be noted that one could have only two indication arrows for showing the user they are off-center front-rear or left-right.

Figure 3:
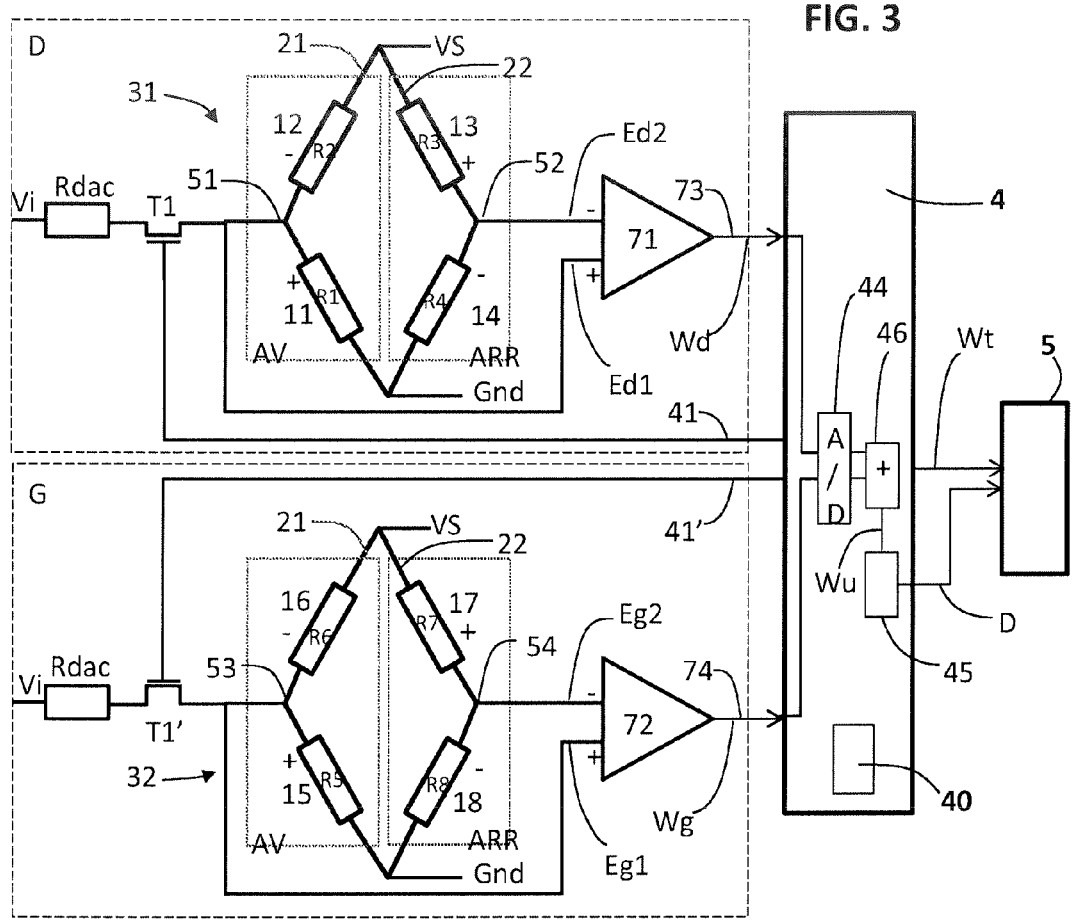
FIG. 3 is a schematic electrical block diagram of the weighing device from FIG. 1.

Turning to FIG. 3, the schematic electrical block diagram of the scale includes, for the right side, a first Wheatstone bridge type circuit 31, which combines the resistors 11-14 of the right-front and right-rear strain gauges.

More specifically, the first Wheatstone bridge type circuit 31 includes both a first branch 21 including the two front-gauge resistors (11, 12) mounted in series between a reference voltage Vs and a ground potential ('Gnd') with a first intermediate point 51 placed between the two resistors and also a second branch 22 comprising the two rear gauge resistors (13, 14) mounted in series between the reference voltage Vs and the ground potential with a second intermediate point 52 placed between the second two resistors.

The reference voltage Vs comes from a stabilized voltage source with a constant preset value, for example 2.8 V in the example considered here; this reference voltage Vs will also be used for analog-to-digital conversion operations.

The voltages present respectively on the first and second intermediate points 51, 52 are sampled with particular interest given to the potential difference between these two intermediate points as will be seen farther on.

More precisely, the first and second intermediate points are connected to a first amplifier 71, whose role is to amplify the potential difference between two intermediate points 51, 52 and to deliver these amplified values to a first output 73 connected to the control unit 4.

Furthermore, the first intermediate point 51 is connected to an auxiliary circuit including a switch T1, a resistor Rdac and an intermediate voltage source Vi. Because of this auxiliary circuit, the first intermediate point 51 can be selectively coupled via the switch T1 to the intermediate voltage Vi. When the switch T1 is open (also referred to as 'at rest' or 'OFF'), the impedance of this auxiliary circuit is infinite, whereas when the switch T1 is activated, the voltage prevailing near the first intermediate point 51 is 'drawn' toward the intermediate voltage Vi through the resistor Rdac.

Preferably, the intermediate voltage Vi be selected to be half of the reference voltage Vs in order to work in a range of optimal linearity.

The control unit 4 controls the activation or deactivation of the switch T1 by means of an output and the control line 41.

The voltage sampled on the first intermediate-point 51 is noted Ed1, the voltage sampled on the second intermediate-point 52 is noted Ed2, and the voltage sampled on the first output 73 of the amplifier 71 is noted Wd.

There is then the equation Wd=G (Ed1−Ed2), where G is the gain of the amplifier 71. The voltages Ed1 and Ed2 are written as follows:

$$Ed1 = \frac{Vi}{1 + \frac{Rdac}{R2} + \frac{Rdac}{R1}} + \frac{Vs}{1 + \frac{R2}{R1} + \frac{R2}{Rdac}}$$

$$Ed2 = \frac{Vs}{1 + \frac{R3}{R4}}$$

If Rdac is infinite, which corresponds to the case where T1 is open, then it follows for Ed1:

$$Ed1 = \frac{Vs}{1 + \frac{R2}{R1}}$$

In the example shown, a value of 2.5 kΩ is selected for Rdac, but of course any other value could be chosen, including zero, without going outside the frame of the present invention.

About the left side, as shown in FIG. 3, the electrical drawing is completely similar and the description thereof will not be repeated here. The switch T1' plays the role of the switch T1 controlled by the line 41'; the second amplifier 72 plays the role of the first amplifier 71 and delivers a second output noted 74 analogous to the first output 73 but which this time relates to the measurements done on the left side (instead of those done on the right side). The voltage sampled on the first intermediate-point 53 is here noted Eg1 and the voltage sampled on the second intermediate-point 54 is here noted Eg2.

There is then, for the left side resulting voltage, the equation Wg=G (Eg1−Eg2), where G is the gain of the amplifier 72.

In the control unit 4, each of these voltage values Wg, Wd is converted in an analog-to-digital converter 44 giving digitized values Num(Wg) and Num(Wd). A simple comparison of these two values Num(Wg), Num(Wd) can be used to identify a left-right off-center condition and to indicate it to the user, for example if the difference is more than a preset threshold.

It should be noted that the two switches T1, T1' are preferably controlled simultaneously into the same state.

In one of the operating phases of the electronic scale, the total weight present Wt on the device is estimated in the control unit 4 by proceeding with an addition of the values acquired respectively on the left side and the right side according to the formula:

Wt=Num(Wg)+Num(Wd)

When T1 and T1' are OFF, the digital value Wt corresponds to the measured weight which is sent to the display 5 to be displayed there in the aforementioned central area.

When the right and left values are substantially different, then it is possible to recognize an imbalance or a left-right off-center, and to indicate it, if appropriate, to the user of the scale, by means of left and right off-center arrows (not shown in the figures).

Additionally, when the switches T1 and T1' are open ('Off'), the measurement is not influenced by the auxiliary circuits of the first and second Wheatstone bridge type circuits 31, 32, and consequently the total weight Wt of the object or person present on the scale is measured directly.

When the switches T1 and T1' are open, the voltages present on the first and second intermediate-points 51, 52 change symmetrically around half of the reference voltage Vs.

In contrast, when the switches T1 and T1' are closed, meaning activated, the measurement done by each of the first and second circuits 31, 32 is influenced by the intermediate potential Vi and the total weight of the object is no longer measured directly but an indicator called 'pseudo-weight' Wu. This can be representative of a front-rear imbalance.

In fact, in this scenario, the first branch 21 of the first bridge 31 has a different behavior than the second branch 22; the voltages present on the first and second intermediate-points 51, 52 no longer change symmetrically around half of Vs as in the case when the switches are open, since the voltage present on the first intermediate-point 51 is returned to Vi by the auxiliary circuit.

As will be seen subsequently, this pseudo-weight Wu will be compared to a theoretical value stored in the memory space 40 of the control unit 4. In fact, the value of Wu is influenced by the front-rear centering of the weight placed on the scale.

Still with reference to FIG. 3, the control unit 4 can send to the display 5 data D representative of the off-center condition, and do this in order to display one or more off-center indicators to the user in order that the user can correct their position and better place themselves on the scale.

The method implemented in the scale is going to be described below.

First, it starts with the preliminary calibration step noted a-, which can for example be done at the end of the manufacturing chain for the scale, or a little later, but preferably before delivery to the end-client.

During this calibration step, a first reference weight, for example a 50 kg weight, is first placed correctly centered on the scale; under these conditions, the total weight Wt is measured while the switches T1, T1' are open. The value read on the display P1 (50), for example 51.2 kg, is used to learn the measurement chain gain error and therefore to know the correction to be applied for indicating the exact weight. Additionally, the pseudo-weight Wu is measured while the switches T1, T1' are closed, which gives the pseudo-weight value corresponding to the reference weight, 50 kg, in centered position and the value is noted P2 (50).

Next by placing a centered 100 kg reference weight and proceeding in the exact same way, the values of the corresponding weight Wt and pseudo-weight Wu noted P1 (100) and P2 (100) are recorded.

According to the example illustrated, a centered 150 kg reference weight is again placed on the scale in the same way, and the values of the corresponding weight Wt and pseudo-weight Wu noted P1 (150) and P2 (150) are recorded.

Of course, instead of using only three reference weights, more weights could be used and a finer grid of the behavior of the measuring chain could be obtained.

Figure 4:
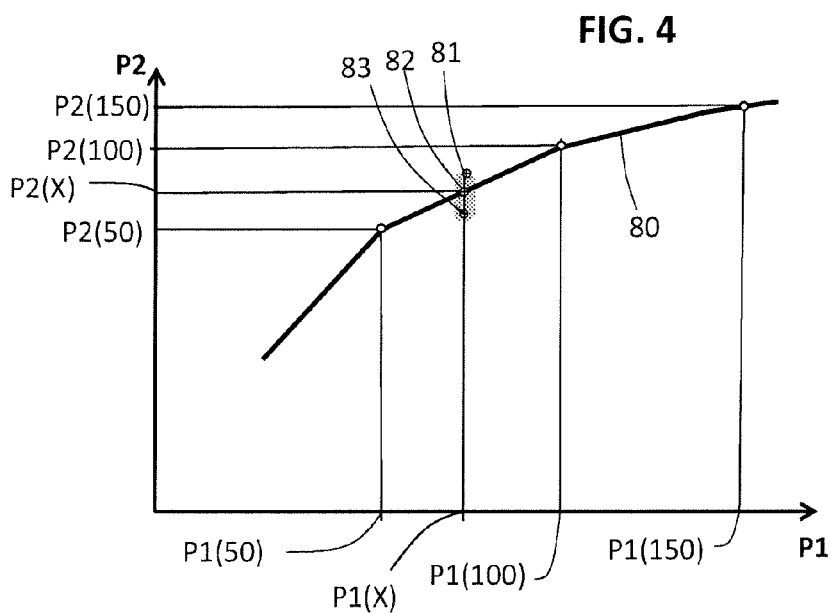
FIG. 4 shows a representative curve from the calibration step of the weighing device from FIG. 1.

Thus a calibration curve is obtained, shown in FIG. 4, that comprises a succession of points connected by segments, with for each point the abscissa having a value P1(X), positioned among of first series of parameters P1 representing the total weight, and the ordinate having a value of P2(X), positioned among the second series of parameters P2 representing the pseudo-weight.

This first and second series of parameters P1, P2 are then stored in nonvolatile memory 40 of the control unit 4.

As indicated above, the first series of parameters P1 serves to correct the total weight measurement Wt that principally relates to the measurement chain gain errors. Concerning the second series of parameters P2, it will be used to determine of front-rear imbalance or off-center condition as will be indicated further on.

When a user wishes to measure his/her weight using the electronic scale, they generally proceed with the step of taring noted -b0 during which the total weight Wt0 is measured in the absence of an object present on the electronic scale. The total weight Wt0 measured under these conditions constitutes a tare value which will be subtracted from the total weight measured with a user or an object placed on the scale.

The taring step could be necessary or not according to the previous events occurring right before on the electronic scale.

As it relates to the method used during the weighing process of the user, it comprises the following two substeps.

b1- a weighing step during which, the first and second output 73, 74 are measured with the switches T1, T1' open, the outputs are digitized; and the digitized sum obtained thereof is corrected by means of the first series of parameters P1 to result in an estimated corrected weight; if it is off-center, the estimated weight can be slightly different from the measured weight Wt1 when not off-center;

b2- an off-center evaluation step during which the switches T1, T1' are made active and the digitized total from the first and second output 73, 74, specifically the pseudo-weight Wu, is compared to a point taken from the second series of parameters P2 corresponding to the estimated weight Wt1 in order to identify an off-center condition and indicate it to the user;

It should be noted that, both for the step -b1 and for the step -b2, the weight of the tare is subtracted from the sum of the first and second digitized value 73, 74.

According to the example shown in FIG. 4, at the end of the steps b1 and b2, the reference point 81, which is away from the curve 80 and which consequently is representative of an off-center condition—in this case towards the rear—is obtained.

According to the method, the steps b1 and b2 are reiterated fairly rapidly, for example several times or several tens of times per second, and the resulting successive points 83 move on the graph from FIG. 4 from one side to the other of curve 80 as a function of the off-center position to the front or rear, whereas Wt varies slightly.

When the user moves to correct an off-center condition, the value of the total weight Wt may vary slightly, whereas the front-rear distance off-center can vary more substantially, which gives a trajectory of points on FIG. 4 which extends in a zone of small width and greater height.

Of course, the control unit 4 processes in real time the measurements received at the first and second output 73, 74 and adapts the display of the off-center indicators in real time.

If the user follows the recommendations given by the off-center indications, then the position of the successive points converges towards a position that is not off-center in this case the point 82 in FIG. 4.

According to an optional step from the method, stopping the iteration of steps b1 and b2 is provided once the front-rear off-center distance and the left-right off-center distance are below preset values at least for a preset time. During this final step, the weight Wt is displayed and the off-center indications are stopped.

FIG. 4 shows the management of the front-rear off-center position, but the control unit 4 also manages the left-right off-center position by directly comparing the values Wg, Wd without needing to refer to a calibration curve. Once the two values Wg, Wd differ more than a preset quantity, then a left-right imbalance is identified and can be reported on the off-center indications of the display.

In the example from FIG. 2, the control unit 4 identifies an off-center condition towards the front and an off-center condition towards the right and therefore activates the front-right arrow 6a.

It should be noted that the two corner arrows could be activated simultaneously, or else there could be eight arrows instead of four, distributed like cardinal points or cardinal directions.

It is also possible to deactivate all the corner arrows once the convergence conditions are achieved.

It should also be noted that the corner arrows could be replaced by a graphical indicator of a point moving to a target or virtual air bubble level type, or any other graphical device of contemporary fashion.

Of course, instead of connecting the first intermediate-point 51 of the first branch 21 to the switch T1 and to the auxiliary circuit, it is entirely possible to choose to instead connect the second intermediate-point 52 from the second branch 22 to the switch T1 and to the auxiliary circuit. The operation will be similar mutatis mutandis to what was described above and the method will also be similar up to the values of the second series of parameters P2.

In a variant (not show) the right-front and left-front strain gauges could be combined in a first Wheatstone bridge type circuit (31) as described and the right-rear and left-rear strain gauges could be combined in a second Wheatstone bridge type circuit (32) as described. Then, the values Wd and Wq on output from the amplifiers would correspond respectively to the front and rear weights and a front-rear off-center position could be determined by simply comparing the values of the front and rear weight and it could be indicated to the user if the difference is greater than a preset threshold.

The invention claimed is:

1. A weighing device, including four feet, respectively, left front, right front, left rear and right rear, where the left-front foot includes a left-front strain gauge, the right-front foot includes a right-front strain gauge, the left-rear foot includes a left-rear strain gauge and the right-rear foot includes a right-rear strain gauge; the weighing device furthermore includes an electronic control unit,
where the right-front and right-rear strain gauges are combined in a first circuit with a first Wheatstone bridge and a first amplifier, with a first output representative of a weight sensed at right side, and the left-front and left-rear strain gauges are arranged in a second circuit with a second Wheatstone bridge and a second amplifier, with a second output representative of a weight sensed at left side, and wherein the first and second outputs are connected to the electronic control unit to be digitized and added and for thus deducing therefrom the total weight of an object present on the device, and wherein the first and second outputs are compared to indicate a possible left-right off center stance on a display,
in which each Wheatstone bridge type circuit includes a first branch comprising two front gauge resistors arranged in series between a reference voltage and a ground potential with a first intermediate point between the two front gauge resistors, and a second branch comprising two rear gauge resistors arranged in series between the reference voltage and the ground potential with a second intermediate point between the two rear gauge resistors, where the first and second intermediate points are connected to the corresponding amplifier, and where one of the first or second into points can furthermore be selectively connected to an activable intermediate voltage source such that when the activable intermediate voltage source is activated, the voltage difference measured between the first and second intermediate points is representative of a front-rear imbalance.

2. The weighing device according to claim 1, in which the electronic control unit is configured for displaying on the display at least one indication for the user of an off-center condition on the scale.

3. The weighing device according to claim 1, in which the two front gauge resistors of each Wheatstone bridge type circuit include a front-gauge first resistor arranged between the ground potential and the first intermediate point and a front-gauge second resistor arranged between the first intermediate point and the reference voltage, and in which the two rear gauge resistors of each Wheatstone bridge type circuit include a rear-gauge first resistor arranged between the ground potential and the second intermediate point and a rear-gauge second resistor arranged between the second intermediate point and the reference voltage,
where the front-gauge first resistor and the rear-gauge first resistor increase with the load whereas the front-gauge second resistor and the rear-gauge second resistor decrease with the load.

4. The weighing device according to claim 1, in which the display includes four corner arrows corresponding respectively to the four feet of the device, where one of the four arrows can be displayed in case of being substantially off-center towards one corner.

5. The weighing device according to claim 1, in which the intermediate voltage is half of the reference voltage.

6. A method implemented in a weighing, device comprising four strain gauges, an electronic control unit, where the right-front and right-rear strain gauges are combined in a first Wheatstone bridge type circuit with a first output coming from a first amplifier and the left-front and left-rear strain gauges are arranged in a second Wheatstone bridge type circuit with a second output coming from a second amplifier,
each Wheatstone bridge type circuit including a first branch comprising two front gauge resistors in series between a reference voltage and a ground potential with a first intermediate point between the two resistors,
and a second branch comprising two rear gauge resistors arranged in series between the reference voltage and the ground potential with a second intermediate point between the two resistors, where the first and second intermediate points are connected to said amplifier, and where one of the first and/or second intermediate points can be selectively connected to an intermediate voltage source,
the method comprising the steps:
a- a calibration step during which a first series of parameters is recorded for a plurality of reference weights placed successively on the weighing device with the first and second intermediate points not coupled to the intermediate voltage source, and a second series of parameters for the plurality of reference weights placed successively on the weighing device with one of the first and/or second intermediate points coupled to the intermediate voltage source;
b1- a weighing step during which the first and second outputs are measured with the first, and second intermediate points not coupled to the intermediate voltage source and the resulting digitized total corrected by means of the first series of parameters, in order to obtain an estimated weight;
b2- an off-center evaluation step during which one of the first and/or second intermediate points coupled to the intermediate voltage source and the digitized total from the first and second outputs is compared to a point from the second series, of parameters corresponding to the estimated weight, in order to identify an off-center condition and indicate it to the user;

c- steps b1- and b2- are repeated.

7. The method according to claim 6, additionally comprising:

d- a final step during which the iteration of steps b1- and b2- is stopped when the evaluation of an off-center distance is less than a preset threshold during at least a preset time and then the resulting estimated weight is displayed on a display.

8. The method according to claim 7, in which the display comprises corner arrows and in which a left-right off-center condition is identified by comparing the first and second outputs from step b1- and a front-rear off-center condition is identified by comparing the total of the first and second outputs to the second series of parameters in step b2- in order to determine whether it is necessary to display a corner arrow corresponding to the more heavily loaded strain gauge.

9. The method according to claim 7, in which the user selects an element on the display by standing intentionally off-center left-right.

10. The method according to claim 7, in which the measured weight is displayed on the display as a function of the total of the first and second outputs corrected by means of the first series of parameters.

11. The method according to claim 6, additionally comprising:

b0- a taring step during which a tare measurement is done with no object placed on the device and a subsequent weight measurement is compensated by an offset corresponding to the tare weight.

12. A weighing device, including four feet, respectively, left front, right front, left rear and right rear, where the left-front foot includes a left-front strain gauge, the right-front foot includes aright-front strain gauge, the left-rear loot includes a left-rear strain gauge and the right-rear foot includes a right-rear strain gauge; the weighing device furthermore includes an electronic control unit, where the right-front and left-front strain gauges are combined in a first circuit with a first Wheatstone bridge and a first amplifier, with a first output representative of a weight sensed at front side, and the right-rear and left-rear strain gauges are arranged in a second circuit with a second Wheatstone bridge and a second amplifier, with a second output representative of a weight sensed at rear side, and wherein the first and second outputs are connected to the electronic control unit to be digitized and added and for thus deducing therefrom the total weight of an object present on the device, and wherein the first and second outputs are compared to indicate a possible front-rear off center stance on a display, in which each Wheatstone bridge type circuit includes a first branch comprising two left gauge resistors arranged in series between a reference voltage and a ground potential with a first intermediate point between the two left gauge resistors, and a second branch comprising two right gauge resistors arranged in series between the reference voltage and the ground potential with a second intermediate point between the two right gauge resistors, where the first and second intermediate points are connected to the corresponding amplifier, and where one of the first or second intermediate points can furthermore be selectively connected to an activable intermediate voltage source such that when the activable intermediate voltage source is activated, the voltage difference measured between the first and second intermediate points is representative of a left-right imbalance.

13. A method implemented in a weighing device comprising four strain gauges, respectively front left, front right, rear left and rear right, an electronic control unit, where the right-front and left-front strain gauges are combined in a first Wheatstone bridge type circuit with a first output coming from a first amplifier and the right-rear and left-rear strain gauges are arranged in a second Wheatstone bridge type circuit with a second output coming from a second amplifier, each Wheatstone bridge type circuit including a first branch comprising two right gauge resistors in series between a reference voltage and a ground potential with a first intermediate point between the two resistors, and a second branch comprising two left gauge resistors arranged in series between the reference voltage, and the ground potential with a second intermediate point between the two resistors, where the first and second intermediate points are connected to said amplifier, and where one of the first and/or second intermediate points can be selectively connected to an intermediate voltage source, the method comprising the steps:

a- a calibration step during which a first series of parameters is recorded for a plurality of reference weights placed successively on the weighing device with the first and second intermediate points not coupled to the intermediate voltage source, and a second series of parameters for the plurality of reference weights placed successively on the weighing device with one of the first and/or second intermediate points coupled to the intermediate voltage source;

b1- a weighing step during which the first and second outputs are measured with the first and second intermediate points not coupled to the intermediate voltage source and the resulting digitized total corrected by means of the first series of parameters, in order to obtain an estimated weight;

b2- an off-center evaluation step during which one of the first and/or second intermediate points coupled to the intermediate voltage source and the digitized total from the first and second outputs is compared to a point from the second series of parameters corresponding to the estimated weight, in order to identify an off-center condition and indicate it to the user;

c- steps b1- and b2- are repeated.

* * * * *